Figure 1:
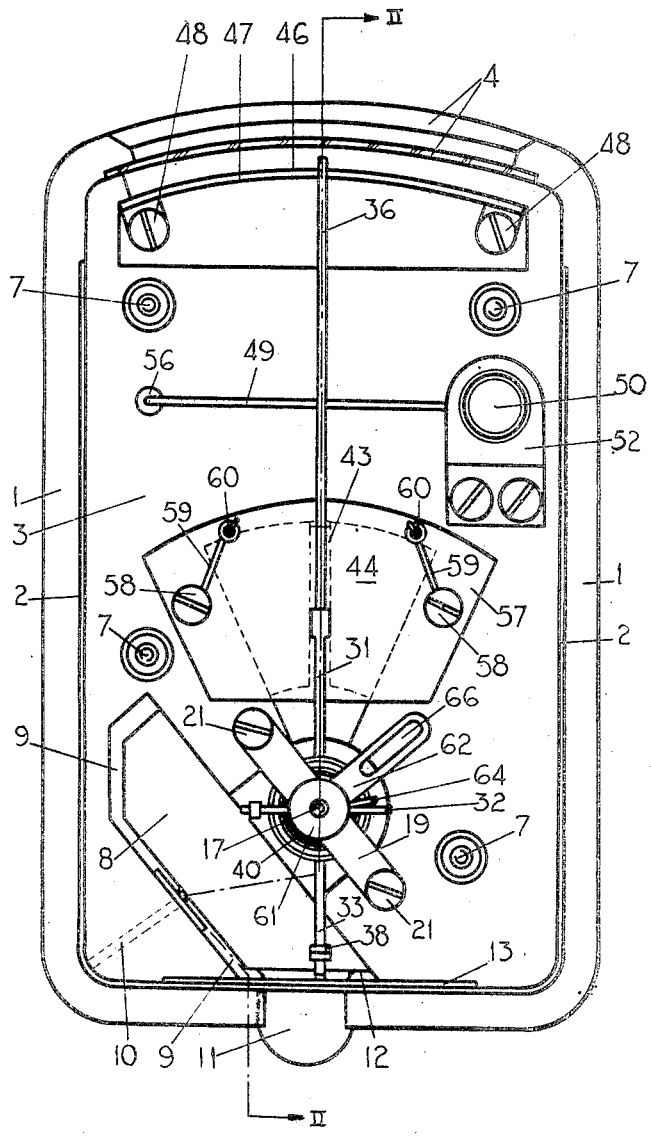

Sept. 15, 1953  T. R. RUDGE  2,651,846
APPARATUS FOR MEASURING THE THICKNESS OF NONMAGNETIZABLE
COATINGS ON MAGNETIZABLE MATERIALS
Filed Sept. 23, 1950  3 Sheets-Sheet 1

INVENTOR
THOMAS RICHARD RUDGE
BY
ATTORNEY

Sept. 15, 1953     T. R. RUDGE     2,651,846
APPARATUS FOR MEASURING THE THICKNESS OF NONMAGNETIZABLE
COATINGS ON MAGNETIZABLE MATERIALS
Filed Sept. 23, 1950     3 Sheets-Sheet 2

INVENTOR
THOMAS RICHARD RUDGE
BY
ATTORNEY

INVENTOR
THOMAS RICHARD RUDGE
ATTORNEY

Patented Sept. 15, 1953

2,651,846

UNITED STATES PATENT OFFICE 2,651,846

APPARATUS FOR MEASURING THE THICKNESS OF NONMAGNETIZABLE COATINGS ON MAGNETIZABLE MATERIALS

Thomas Richard Rudge, Timperley, Altrincham, England, assignor to The General Electric Company Limited, London, England Application September 23, 1950, Serial No. 186,366
In Great Britain September 29, 1949

9 Claims. (Cl. 33—172)

This invention is concerned with improvements in or relating to apparatus for measuring the thickness of layers of non-magnetizable material on magnetizable materials. Such apparatus may, for example, be employed for measuring the thickness of the tin layer on a sheet of tin plate.

It is to be understood that the term "magnetizable materials" as used in this specification, includes only those materials having ferromagnetic properties and that any other material is considered therefore as being non-magnetizable.

It is an object of the present invention to provide an improved, but simple and rugged apparatus for measuring the thickness of layers of non-magnetizable material on magnetizable materials.

According to the present invention, apparatus for measuring the thickness of non-magnetizable layers on magnetizable materials comprises a straight bar magnet, terminating in a contact-making unit and so arranged that when presented to magnetizable material having one or more layers of non-magnetizable material the magnet is inclined thereto, and a biassed moving iron element positioned towards the mid-point of said magnet and in the field of said magnet which is arranged to move an index in relation to a suitably calibrated scale.

According to a feature of the present invention apparatus for measuring the thickness of layers of non-magnetizable material on magnetizable materials comprises a bar magnet, a contact-making unit of magnetizable material, which unit is in contact with one end of the bar magnet and is arranged so that tangents to the surface of the contact-making unit at points, which, in operation, are brought into contact with the surface of material on which measurements are to be made, are inclined to the longitudinal axis of the bar magnet, a biassed moving-iron element mounted near the mid-point of the bar magnet, and an index arranged to move in relation to a scale in dependence upon the movement of the moving-iron element.

Preferably the bar magnet is mounted within a casing of non-magnetizable material and part at least of said contact-making unit projects out of the casing through a hole.

Figure 2:
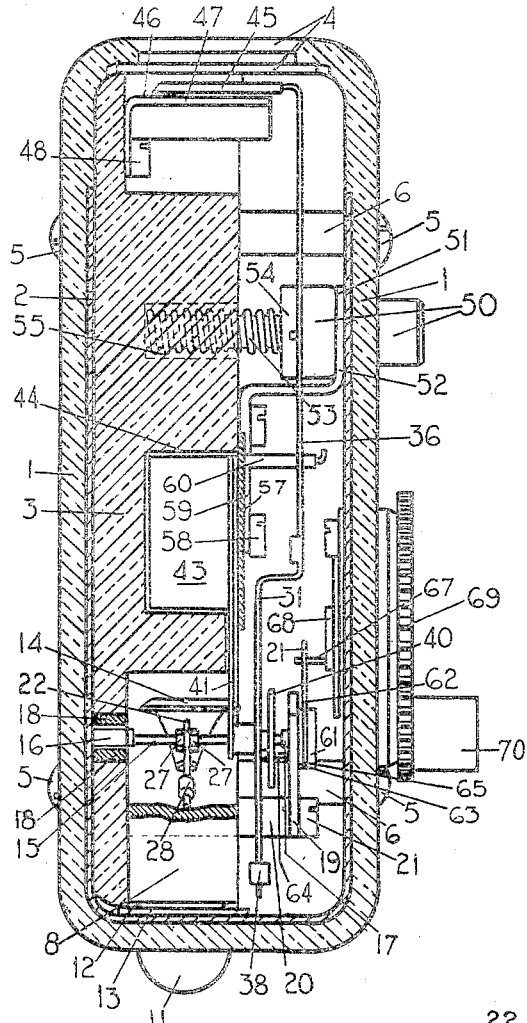
Figure 3:
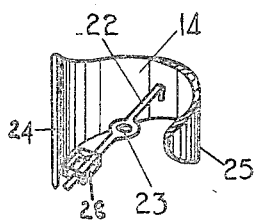
Figure 4:
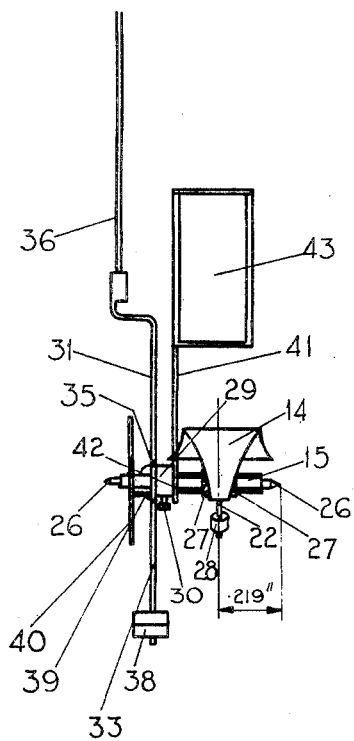
Figure 5:
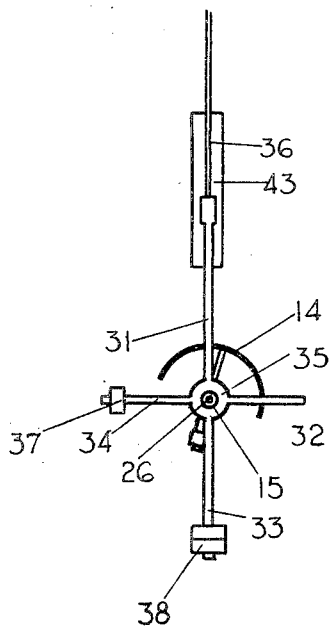

One embodiment of apparatus according to the present invention will now be described by way of example with reference to the accompanying drawings in which, Figure 1 shows a view of the embodiment with the front face of the casings removed, Figure 2 shows a section at II—II in Figure 1, Figure 3 shows a perspective view of the moving-iron element used in the embodiment, Figure 4 shows an elevation of the moving parts of the embodiment and Figure 5 shows an end view of the said moving parts.

Referring to Figures 1 and 2 of the accompanying drawings, the apparatus has a main casing 1 of synthetic resin which is in two parts. A pressed steel casing 2 lines the greater part of the inner walls of the casing 1. Transparent window 4 is provided in the casing 1 to enable a scale and index, as will be described hereinafter, to be viewed. The casings 1 and 2 are secured to a synthetic resin block 3 by means of eight screws 5 (only four of which are shown in the drawings), the pillars 6 serving to space the front cover of the instrument, that is the right hand face of the instrument as shown in Figure 2, away from the block 3. The screws 5 are screwed into brass screw threaded inserts 7 which are pressed into the block 3.

A bar magnet 8 of the alloy known as Alnico, or an anistropic magnet, fits inside a recess 9 in the block 3 and is secured in position by a grub screw 10 (shown in dotted outline in Figure 1) passing through the block 3 to its edge. A contact-making unit 11 of chromium-plated mild steel is secured in close contact with the face 12 of the bar magnet 8. The contact-making member 11 projects from the underside of the apparatus through holes in the casings 1 and 2, the external surface of the member 11 projecting through the holes being spherical. A rubber gasket 13, through which also the contact-making member 11 projects, is provided between the block 3 and the pressed steel casing 2.

A moving-iron element 14 (which is not visible in Figure 1) is mounted on a shaft 15 near the mid-point of the bar magnet 8. The shaft 15 is mounted in jewel bearings in holders 16 and 17, the one bearing holder 16 being screwed into a screw-threaded insert 18 in the block 3 and the other bearing holder 17 being screwed into a hole in a brass cross bar 19 which is supported on two pillars 20 and rigidly attached to the block 3 by the screws 21.

The moving parts of the apparatus, which include the moving-iron element 14 and the shaft 15, will now be described with reference to Figures 3, 4 and 5 of the accompanying drawing the same parts in Figures 1 and 2 only some of which are shown for the sake of clarity being however labelled with the references used in Figures 3, 4 and 5. Figure 3 shows a perspective view of the moving-iron element 14, which is a shaped sheet of nickel-iron to which a brass right-angled bracket 22 is sweated. A hole 23 is provided in the bracket 22, through which the shaft 15 may be passed in order to mount the moving-iron element 14. The sheet of iron tapers from the one end 24 to the other end 25, and is curved in a spiral so that the end 24 lies nearer to the hole 23 than does the other end 25.

The shaft 15 has a bearing point 26 at each end, and is screw-threaded for part of its length. The moving iron element 14 is mounted on the shaft 15 by passing the shaft 15 through the hole 23 in the bracket 22 and screwing up two nuts 27 one on either side of the bracket 22. A balance weight 28 is soldered to the end of the bracket 22 and is provided to help balance the moving parts of the apparatus. A flanged collar 29 is also mounted on the shaft 15, being secured to it by a grub screw 30. Four metal strips 31–34 project from one flange 35 on the collar 29, in directions between adjacent pairs of which there is a right angle. One of the strips 31 is bent twice at right angles, and at its end is attached to one end of a shaft 36 the other end of which forms an index as will be described hereinafter. The other three strips 32–34 may have balance weights, as for example those designated 37 and 38 in the drawings, soldered to them to balance the moving parts of the apparatus. A tongue 39 is bent up from the flange 35, and projects from it in a direction substantially parallel to the shaft 15. The end of the tongue 39 remote from the flange 35 is soldered to the inner end of a planar hairspring 40, the outer end of which is fixed, in a manner which will be described hereinafter, relative to the bearings of the shaft 15. The hairspring 40 therefore acts as a bias to the movement of the shaft 15.

A metal strip 41 projects from the other flange 42 of the collar 29, and is attached to a light metal vane 43, which swings in a cavity 44 (Figures 1 and 2) in the block 3 as the shaft 15 rotates and provides damping of the rotational motion of the shaft 15.

Referring again to Figures 1 and 2, the end of the shaft 36 remote from the metal strip 31 is bent at right angles and flattened to form an index 45, which as the shaft 15 rotates in its bearings, moves over a scale engraved on, or attached to the face 46 of the curved metal bracket 47, which is held by screws 48 on to the block 3. A simple clamping mechanism is provided to prevent the moving parts from moving when the apparatus is not in use. A metal rod 49 projects from a plastic push button 50, part of which projects through holes in the casings 1 and 2. A shoulder 51 on the push button 50 is held against a metal bracket 52, which is screwed to the block 3, by a spring 53, which is compressed between the shoulder 54 on the push button 50 and the bottom of a cylindrical hole 55 in the block 3. The push button 50 does not reach to the bottom of the hole 55 when the shoulder 51 bears against the bracket 52, and may be depressed towards the block 3 by exerting a suitable pressure. The end of the rod 49 remote from the push button 50 is bent at right angles and projects into a hole 56 in the block 3. When the push button 50 is not depressed, the rod 49 bears against the shaft 36 and prevents the moving parts from swinging freely in their bearings. On depressing the push button 50, the rod 49 is moved towards the block 3 and no longer bears on the shaft 36 and the moving parts can then swing freely in their bearings. Thus in operation of the instrument the push button 50 must be kept depressed.

A metal cover plate 57 covers the cavity 44 in which the vane 43 swings, and is held down by two screws 58 under each of which is also held a spring stop 59 partly covered with a layer of resilient material 60, to restrict the movement of the shaft 36.

The tension on the hairspring 40 may be altered in order to provide a zero adjustment of the scale of the apparatus. The inner end of the hairspring 40, as previously described, is soldered to the tongue 39 which is indirectly rigidly attached to the shaft 15. A small circular metal disc 61 is screwed on to the jewel bearing holder 17, the outer surface of which has a screw thread cut on it in order that it may be screwed into the cross bar 19 and which holder 17 projects through the cross bar 19 on the side of it remote from the shaft 15. Fitted over the bearing holder 17, and held between the disc 61 and the cross bar 19 are a metal tag 62, a washer 63 to which is soldered a metal strip 64 and spring washers 65. The strip 64 is bent at right angles and is soldered at the end to the outer end of the hairspring 40. The tag 62 has a slot 66 cut in it, into which projects a pin 67, mounted eccentrically on a disc 68. The disc 68 is rigidly connected to the milled wheel 69 on the outside of the casing 1 by a short shaft passing as a slide fit through holes in the casings 1 and 2. On rotation of the milled wheel 69, the disc 68 rotates correspondingly and the pin 67 causes the tag 62 to rotate through small angles, a rotation of the milled wheel 69 by 180° causing the tag 62 to rotate through an angle of approximately 30°. The metal disc 61 is screwed sufficiently tightly on to the bearing holder 17, that the rotation of the tag 62 causes the washer 63 and the metal strip 64 soldered thereto, to rotate through the same angle. Rotation of the metal strip 64 alters the tension in the hairspring 40, and hence the bias on the movement of the shaft 15. A locking screw the head of which is shielded by the cup 70, passes through a semicircular slot in the milled wheel 69 and may be screwed down to prevent the milled wheel 69 from rotating.

The apparatus described operates on the principle that when the contact-making unit 11 is placed near the surface of a body of magnetizable material, the magnetic field around the bar magnet 8 is distorted, and in particular the magnetic field at the moving-iron element 14 alters, and a force is consequently exerted on the moving-iron element 14 which causes the shaft 15 to rotate. The pressed steel casing 2 is provided to increase the sensitivity and accuracy of the arrangement, in that it serves to provide that the field of the bar magnet 8 is distorted only by the proximity of magnetizable material to the flux gap between the casing 2 and the contact-making unit 11 and, within limits, is substantially independent, for example, of the angle of presentation of the contact-making unit 11 to the surface of the magnetizable material, or the position of the other pole of the bar magnet 8 relative to parts of the magnetizable material remote from the point of contact.

The apparatus may be calibrated by first bringing the contact-making unit 11 into contact with a plane surface of a sheet of magnetizable material on which there are no layers of non-magnetizable material. The index 45 is set to a zero on the scale by adjusting the tension on the hairspring 40 by unclamping and rotating the milled wheel 69. The contact-making unit 11 is then brought into contact with plane surfaces on like sheets of magnetizable material on which there are layers of non-magnetizable material of different known thicknesses. By noting the deflections of the index 45, when the contact-making unit 11 is in contact with the various sheets of magnetizable material the scale may be readily calibrated. It will be appreciated that the index 45 undergoes the greatest deflection from its rest position when the contact-making unit 11 is in contact with an uncoated surface of a body of magnetizable material, the field of the bar magnet 8 then undergoing the greatest distortion, and that the deflection of the index 45 becomes less as the layer of non-magnetizable material on the surface becomes thicker.

In operation the performance may be made more accurate by adjusting the zero of the apparatus when in contact with an uncoated body exactly the same as the one on which the thickness of a layer of non-magnetizable material is to be measured, holding the apparatus and the body in the relative positions in which the layer thickness measurement is to be made. In this way the thickness of layers of non-magnetizable material on surfaces of bodies other than planar may be readily measured with considerable accuracy, and in particular the apparatus according to the present invention is particularly useful, as compared with known apparatus for the same purpose, for measuring the thickness of layers on concave surfaces and on small bodies.

Apparatus in accordance with the present invention also has the advantage over known forms of apparatus for the same purpose, that there is only one contact-making unit, and the thickness measured is that at the point of the contact, and not as in the cases of known apparatus having two or more contact-making units, the average of the thicknesses of the layer at the two or more points of contact.

It will be appreciated further that apparatus in accordance with the invention is not limited to the particular form hereinbefore described and that the form may be varied. Thus for example an alternative form of contact-making unit may be used, which is substantially conical, the base of the cone being in contact with the face 12 of the bar magnet 8, and the slightly rounded point of the cone projecting through the casings 1 and 2 of the apparatus. Furthermore the bar magnet 8 may be positioned differently within the casings 1 and 2, and it is to be understood that the term inclined used in this specification to define the orientation of the longitudinal axis of the bar magnet, includes case in which the inclination is ninety degrees.

I claim:

1. Apparatus for measuring the thickness of layers of non-magnetizable material on magnetizable materials comprising, a bar magnet, a single contact-making unit of magnetizable material, said unit being in contact with one end only of the bar magnet and having a contact-making surface at least part of which in operation is brought into contact with the surface of the material on which measurements are to be made, the said contact-making surface being smooth and non-concave and having a configuration such that the tangents at the points on said surface which in operation are brought into contact with the surface of said material are inclined to the longitudinal axis of the bar magnet, a moving-iron element, means for supporting the moving-iron element near the mid-point of the bar magnet said means permitting rotation of the moving-iron element about an axis fixed with respect to the bar magnet, means for exerting a force biassing the moving-iron element towards a chosen orientation about said axis of rotation, and a scale and an associated index coupled to the moving-iron so as to move across the scale in dependance upon rotations of the moving-iron element about said axis of rotation.

2. Apparatus according to claim 1, in which said contact-making unit has a first part in the form of a portion of a sphere, and a second part lying between said first part and the end of the bar magnet with which the contact-making unit is in contact, and having a surface in contact with the said end of the bar magnet.

3. Apparatus according to claim 1, in which said contact-making unit is in the form of a cone having a rounded point, the base of which is in contact with the end of the bar magnet with which the contact-making unit is in contact.

4. Apparatus according to claim 1, in which said means for supporting the moving-iron element is a rotary shaft and said means for exerting a biassing force on the moving-iron element is a hairspring one end of which is coupled to the rotary shaft and the other end of which is attached to a member which may be set within a range of positions fixed relative to the axis of the rotary shaft.

5. Apparatus according to claim 1 in which said moving iron element is in the form of a sheet lying in planes parallel to the said axis of rotation, curved substantially in a spiral about the said axis of rotation through an angle less than three hundred and sixty degrees, and tapering from the end nearer to the end further from the said axis of rotation.

6. Apparatus for measuring the thickness of layers of non-magnetizable material on magnetizable materials comprising a casing of magnetizable material, a bar magnet rigidly mounted within said casing, a single contact-making unit of magnetizable material, said unit being in contact with one end only of the bar magnet, projecting through a hole in said casing, and having a contact-making surface external to said casing at least part of which in operation is brought into contact with the surface of the material on which measurements are to be made, the said contact-making surface being smooth and non-concave and having a configuration such that the tangents at the points on said surface which in operation are brought into contact with the surface of said material are inclined to the longitudinal axis of the bar magnet, a moving-iron element, means for supporting the moving-iron element within said casing and near mid-point of the bar magnet, said means permitting rotation of the moving-iron element about an axis fixed with respect to the bar magnet, means for exerting a force biassing the moving-iron element towards a chosen orientation about said axis of rotation, and a scale and an associated index coupled to the moving-iron element so as to move across the scale in dependance upon rotations of the moving-iron element about said axis of rotation.

7. Apparatus according to claim 6, in which a part of said contact-making unit is in the form of a portion of a sphere and the said surface external to the said casing is a part at least of the surface of said sphere.

8. Apparatus according to claim 6, in which said contact-making unit is in the form of a cone having a rounded point, the base of which is in contact with the bar magnet and the rounded point of which is the said surface external to the said casing.

9. Apparatus for measuring the thickness of layers of non-magnetizable material on magnetizable materials comprising a casing of magnetizable material substantially in the form of a flat rectangular box, a bar magnet rigidly mounted within said casing with one end close to one of the longer edge faces of the casing and the other end close to one of the shorter edge faces of the casing, a single contact-making unit of magnetizable material, said unit being in contact with one end only of the bar magnet, projecting through a hole in the edge face of the casing close to the said one end of the bar magnet, and having a contact-making surface external to said casing at least part of which in operation is brought into contact with the surface of the material on which measurements are to be made, the said contact-making surface being smooth and non-concave and having a configuration such that the tangents at the points on said surface which in operation are brought into contact with the surface of said material are inclined to the longitudinal axis of the bar magnet, a moving-iron element, means for supporting the moving-iron element within said casing and near mid-point of the bar magnet, said means permitting rotation of the moving-iron element about an axis fixed with respect to the bar magnet, means for exerting a force biassing the moving-iron element towards a chosen orientation about said axis of rotation, and a scale and an associated index coupled to the moving-iron element so as to move across the scale in dependance upon rotations of the moving-iron element about said axis of rotation.

THOMAS RICHARD RUDGE.

References Cited in the file of this patent

UNITED STATES PATENTS

| Number | Name | Date |
|---|---|---|
| 2,051,780 | Brown | Aug. 18, 1936 |
| 2,058,518 | Schuster | Oct. 27, 1936 |
| 2,226,275 | Albot et al. | Dec. 24, 1940 |
| 2,384,529 | Breitenstein | Sept. 11, 1945 |
| 2,469,476 | Sellars | May 10, 1949 |
| 2,481,345 | Reynst | Sept. 6, 1949 |